Dec. 1, 1970   R. D. WAITE   3,543,586
INSTRUMENT ASSEMBLY
Filed Nov. 19, 1968

INVENTOR
RALPH D. WAITE
BY
Smythe & Moore
ATTORNEYS

United States Patent Office 3,543,586
Patented Dec. 1, 1970

3,543,586
INSTRUMENT ASSEMBLY
Ralph D. Waite, Sellersville, Pa., assignor to Ametek, Inc., New York, N.Y., a corporation of Delaware
Filed Nov. 19, 1968, Ser. No. 777,073
Int. Cl. G01d 11/00
U.S. Cl. 73—431                                8 Claims

ABSTRACT OF THE DISCLOSURE

An instrument casing of a plastic material has a closed end wall with a bore formed in the end wall and opening within the casing. An instrument movement is provided with a tubular extension which is snugly received within the bore to mount the movement within the casing. A series of annular serrations are provided on the tubular extension to grip securely the inner face of the bore.

---

The present invention relates to an instrument assembly and, more particularly, to the mounting of an instrument movement within an instrument casing.

Many forms of instruments have been constructed in order to indicate, measure or record various conditions, such as temperature and pressure. Such instruments generally comprise an instrument casing assembly which consists of an instrument casing, an instrument movement responsive to a condition being sensed, and an indicator which generally moves over a calibrated scale in response to the conditions sensed by the instrument movement. In the manufacture of such instruments, an ever recurring source of difficulty is in the proper assembly of these components so that they will function in the manner in which they are intended to function. In the usual assembly of the instrument movement within the casing, the movement is provided with a bracket and holes through which bolts or screws are passed to attach the bracket to a wall of the instrument casing. While such assembly arrangements have been generally satisfactory, the necessity for providing a supporting bracket for the instrument unduly complicates the construction of the movement and adds significantly to the assembly time. Considerable efforts have been expended in order to simplify the structures of the several components of such instruments to decrease the assembly time and thereby reduce the likelihood of poorly assembled instruments.

One of the objects of the present invention is to provide an improved instrument casing assembly.

Another of the objects of the present invention is to provide an improved arrangement for mounting an instrument movement within an instrument casing.

A still further object of the present invention is to provide a plastic instrument casing within which an instrument movement may quickly and securely be mounted.

In one aspect of the invention, the instrument casing assembly may comprise an instrument casing of a plastic material having a wall. The wall is provided with a bore which opens within the casing. An instrument movement having a tubular extension is mounted within the casing by inserting the tubular extension into the bore. The outer surface of the tubular extension is provided with gripping means such as annular serrations which tightly engage and grip the inner face of the bore to mount securely the instrument movement within the casing. The bore may communicate with the exterior of the instrument casing through a connecting passage which opens within a pipe connection fitting provided on the outer surface of the casing.

Other objects, advantages and features of the invention will become apparent in conjunction with the accompanying drawings, which are merely exemplary.

Figure 1:
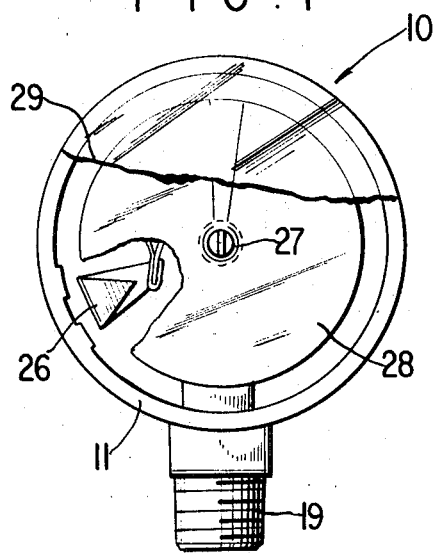
Figure 2:
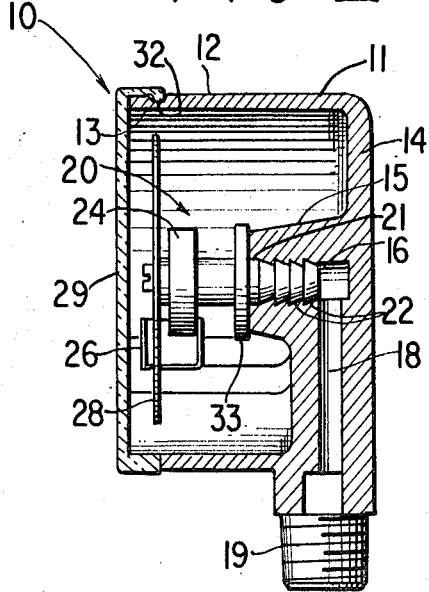
Figure 3:
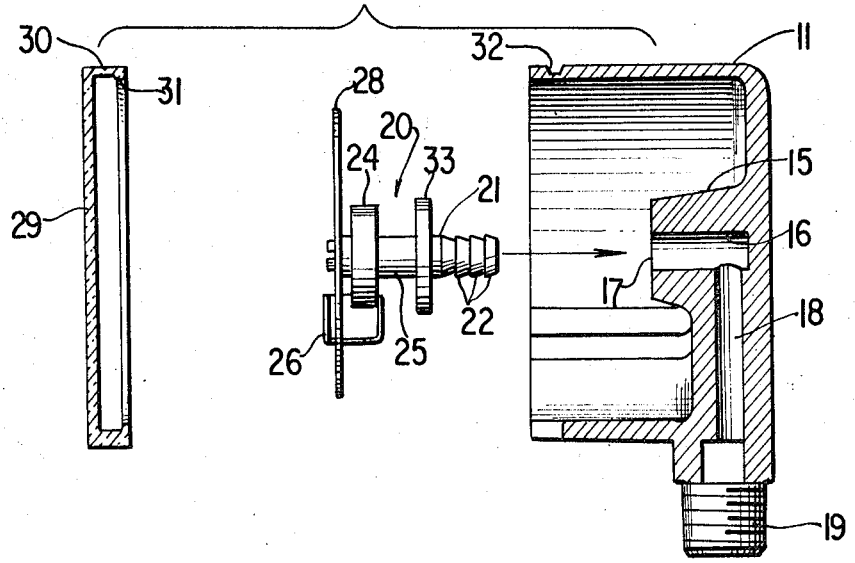
Figure 4:
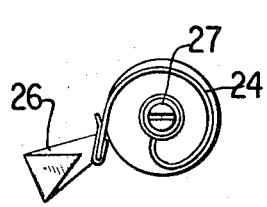
Figure 5:
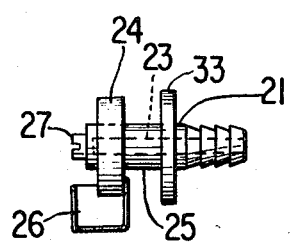

In the drawings:
FIG. 1 is a front elevational view of an instrument casing assembly according to the present invention with a portion of the dial face cut away;
FIG. 2 is a vertical sectional view of the assembly shown in FIG. 1;
FIG. 3 is an exploded view of the section of FIG. 2 to illustrate the assembly of the several components of the instrument;
FIG. 4 is a front elevational view of an instrument movement which can be employed in the casing assembly of the present invention; and
FIG. 5 is a side elevational view of the instrument movement shown in FIG. 4.

As may be seen in FIGS. 1 to 3, inclusive, the instrument casing assembly of the present invention is indicated generally at 10 and comprises an instrument casing 11 of plastic material. The plastic material should be stiff, dimensionally stable and structurally strong. However, the plastic material should also have a spring-like resiliency. The plastic material may also have additional non-metal properties such as colorability, low thermal and electrical conductivity, high-speed moldability and economy. One such plastic material which is suitable for use as the instrument casing is a crystalline acetal copolymer based on trioxane. One such acetal is manufactured by the Celanese Corporation of America under its trademark "Celcon," such as Celcon M90 Series. Celcon M90 has the following characteristics:

Specific gravity: 1.410
Density: 0.0507 lb./cu. in.
Specific volume: 19.7 cu. in./lb.
Elongation:
    −30° F.: 25%
    73° F.: 60%
    140° F.: 230%
Hardness Rockwell: M80

The plastic material of the casing should maintain its high mechanical strength, stiffness, toughness, and resistance to impact force over extended periods of time and through broad ranges of temperature and pressure.

Another plastic material suitable for use in the instrument is polypropylene. Particular types of polypropylene which are suitable are manufactured by Union Carbide Corporation and designated JMDA 4503 and JMDD 4400.

The instrument casing or housing 11 is substantially cylindrical in shape and has a cylindrical wall 12 with an open end 13 and an end wall 14 closing the other end. The inner face of end wall 14 is formed with a raised portion or boss 15 in which is formed a bore 16 opening at 17 (FIG. 3) into the interior of the casing.

Communicating with the bore is a passage 18 which opens into a pipe connection or suitable fitting 19 which may be formed integrally on the outer surface of the casing 11. All of the above described elements of the casing may be molded integrally in the casing when it is being formed from the plastic material. It should be apparent that the connection 19 also could be located on the back or end wall 14.

An instrument movement indicated generally at 20 is provided with a tubular extension 21 having on its outer surface a series of annular serrations 22. The particular instrument movement illustrated is of the spiral-gauge type and is fluid responsive. The movement is provided with an inner passage 23 (FIG. 5) which communicates with one end of a spiral-shaped Bourdon tube 24 whose end is fixedly secured to the socket 25. On the movable portion of the movement, an indicator dial 28 is mounted by means of staking shoulder 27. The slot in 27 permits rotation of the movement for calibration. The pointer 26 moves over the edge of the dial face 28 upon which there may be provided suitable indicia.

The open end 13 of the instrument casing is closed by a transparent window 29 which may be of glass or a plastic and is provided with a flange 30 having an inner lip 31 which snaps into a corresponding groove 32 on the outer face of casing 11. It is to be understood that other forms of window closure assemblies may be used.

It can be seen that in the assembly of the instrument according to the present invention, the tubular extension 21 of the instrument movement is inserted into the bore 16 of the instrument casing. The serrations 22 will grip the inner face of bore 16 to secure tightly the movement in the position shown in FIG. 2. As described above, the plastic material of the casing has a sufficient degree of resiliency so that the serrations become embedded therein, as also shown in FIG. 2, to hold the instrument movement within the casing. By proper selection of sizes and fits the joint can be made pressure tight. If desired, the dial face may also be mounted on the instrument movement so that the instrument movement, dial face and pointer constitute a sub-assembly for the instrument.

The positioning of the instrument movement within the casing is determined by a flange 33 which contacts the outer surface of the boss or raised portion 15 in which the bore 16 is formed. The use of this flange insures uniformity of assembly of the instruments and thus accuracy in their operation.

Thus, it can be seen that the present invention has provided a simplified instrument casing assembly wherein the instrument movement is mounted within the instrument casing by inserting a tubular extension of the instrument movement into a socket formed integrally with the casing. By constructing the casing of a suitable plastic material, a secure mounting of the movement within the casing will be achieved in this manner.

It will be understood that various details of construction and arrangements of parts can be changed without departing from the spirit of the invention, except as defined in the appended claims.

What is claimed is:

1. In an instrument casing assembly, the combination including an instrument casing of resilient plastic material having a wall, said wall having a bore therein opening within said casing, and a composite and unitary instrument movement including sensing and interconnected transmitting elements, said movement having a rigid tubular extension extending into and closely received within said bore, said extension having at least one annular projection thereon embeddedly engaging said bore when forcibly inserted thereinto to provide a pressure tight fit therewith and also to mount said composite movement in position within the casing.

2. In an instrument casing assembly as claimed in claim 1, said wall being an end wall.

3. In an instrument casing assembly as claimed in claim 2 with said instrument casing being cylindrical with one end open and the other end closed by said end wall, and a raised portion on the inner face of said end wall with said bore being in said raised portion.

4. In an instrument casing assembly as claimed in claim 3 with said bore being parallel to the longitudinal axis of said cylindrical casing.

5. In an instrument casing assembly as claimed in claim 4 with a second bore within said casing end wall with one end communicating with said first bore and the other end opening exteriorly of the casing.

6. In an instrument casing assembly as claimed in claim 5 and comprising a pipe connection fitting on said casing at the other end of said second bore.

7. In an instrument casing assembly as claimed in claim 2 and comprising means on said tubular extension for gripping the inner face of said bore to secure a tight fit therebetween.

8. In an instrument casing assembly as claimed in claim 7 with said means comprising annular serration means thereon to effect a pressure tight fit within the bore.

References Cited

UNITED STATES PATENTS

| | | | |
|---|---|---|---|
| 201,637 | 3/1878 | Treat | 73—413 UX |
| 1,994,784 | 3/1935 | Porzel | 285—239 |
| 1,996,855 | 4/1935 | Cheswright | 285—239 |
| 2,612,132 | 9/1952 | Triplett | 73—431 X |
| 3,080,758 | 3/1963 | Decker | 73—392 X |
| 3,250,292 | 5/1966 | Mollick | 73—411 X |
| 3,388,600 | 6/1968 | Gorgens et al. | 73—431 |

LOUIS R. PRINCE, Primary Examiner

D. M. YASICH, Assistant Examiner

U.S. Cl. X.R.

73—420